(12) United States Patent
Becker et al.

(10) Patent No.: US 8,494,221 B2
(45) Date of Patent: Jul. 23, 2013

(54) INVERSE STAR TRACKER USING PSUEDO-RANDOM OVERLAPPING CIRCLES

(75) Inventors: Karl H. Becker, Riverview, FL (US); Nicholas Lyn-Sue, Seminole, MN (US); Manuel I. Rodriguez, St. Petersburg, FL (US); John S. White, Clearwater, FL (US)

(73) Assignee: Honeywell International Inc., Morristown, NJ (US)

( * ) Notice: Subject to any disclaimer, the term of this patent is extended or adjusted under 35 U.S.C. 154(b) by 223 days.

(21) Appl. No.: 13/096,503

(22) Filed: Apr. 28, 2011

(65) Prior Publication Data

US 2012/0274810 A1    Nov. 1, 2012

(51) Int. Cl.
*G06K 9/00* (2006.01)
*G01C 21/10* (2006.01)

(52) U.S. Cl.
USPC ............................................ 382/103; 701/500

(58) Field of Classification Search
None
See application file for complete search history.

(56) References Cited

U.S. PATENT DOCUMENTS

| | | | | |
|---|---|---|---|---|
| 5,814,806 | A * | 9/1998 | Tanaka et al. | 235/494 |
| 6,116,507 | A * | 9/2000 | Fukuda et al. | 235/454 |
| 7,274,439 | B2 * | 9/2007 | Kurth | 356/28 |
| 7,295,947 | B2 | 11/2007 | Kurth et al. | |
| 7,340,344 | B2 | 3/2008 | Chappell | |
| 7,368,745 | B2 | 5/2008 | Kouris et al. | |
| 7,422,154 | B2 * | 9/2008 | Ericson | 235/462.11 |
| 7,593,829 | B2 | 9/2009 | White | |
| 7,617,070 | B2 * | 11/2009 | Kurth et al. | 702/150 |
| 2004/0089083 | A1 * | 5/2004 | Bailey | 74/5.4 |
| 2004/0105580 | A1 * | 6/2004 | Hager et al. | 382/154 |
| 2004/0239844 | A1 * | 12/2004 | Kanoh et al. | 349/113 |
| 2006/0058946 | A1 * | 3/2006 | Chappell | 701/207 |
| 2006/0058978 | A1 * | 3/2006 | Kurth et al. | 702/150 |
| 2008/0144111 | A1 * | 6/2008 | Lee et al. | 358/3.1 |
| 2008/0284790 | A1 | 11/2008 | Protola et al. | |
| 2009/0128562 | A1 * | 5/2009 | McCombe et al. | 345/427 |
| 2010/0017123 | A1 * | 1/2010 | Dropps et al. | 701/212 |
| 2010/0180428 | A1 * | 7/2010 | Jones et al. | 29/592.1 |
| 2012/0118968 | A1 * | 5/2012 | Yoshida | 235/462.01 |
| 2012/0314973 | A1 * | 12/2012 | Ide et al. | 382/286 |

OTHER PUBLICATIONS

16.C. Colombo , D. Comanducci and A. del Bimbo "Camera calibration with two arbitrary coaxial circles", Proc. 9th Eur. Conf. Comput. Vis., vol. I, pp. 265-276 2006.*

* cited by examiner

*Primary Examiner* — Stephen R Koziol
*Assistant Examiner* — Sean Conner
(74) *Attorney, Agent, or Firm* — Fogg & Powers LLC

(57) ABSTRACT

A system comprises a rotatable object having a pseudo-random pattern of overlapping rounded shapes on an outer surface of the rotatable object and an image sensor configured to capture an image of a portion of the pseudo-random pattern on the outer surface. The system also comprises a memory configured to store a pattern map corresponding to the pseudo-random pattern on the outer surface of the rotatable object; and a processing unit configured to correlate the portion of the pseudo-random pattern in the captured image with a corresponding portion of the pattern map stored on the memory.

20 Claims, 5 Drawing Sheets

INVERSE STAR TRACKER USING PSUEDO-RANDOM OVERLAPPING CIRCLES

BACKGROUND

Some image-based navigation systems compare images obtained at different moments in time to determine how an object has moved. For example, some image-based navigation systems calculate the motion necessary to change the relative position of objects in a first image to the position of the objects in a second image. The calculated motion corresponds to the motion of the vehicle housing the image-based navigation system.

SUMMARY

In one embodiment, a system is provided. The system comprises a rotatable object having a pseudo-random pattern of overlapping rounded shapes on an outer surface of the rotatable object and an image sensor configured to capture an image of a portion of the pseudo-random pattern on the outer surface. The system also comprises a memory configured to store a pattern map corresponding to the pseudo-random pattern on the outer surface of the rotatable object; and a processing unit configured to correlate the portion of the pseudo-random pattern in the captured image with a corresponding portion of the pattern map stored on the memory.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
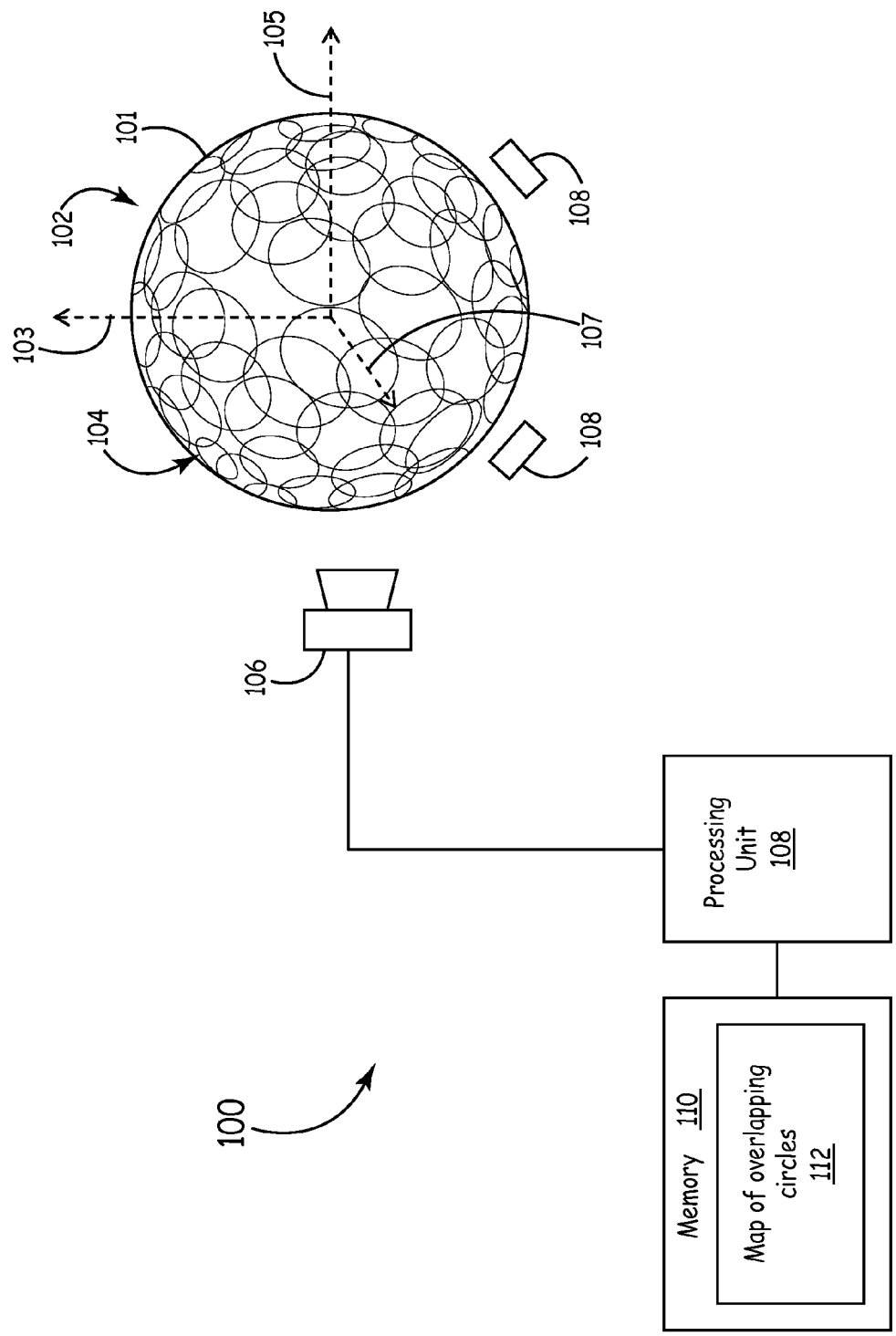
FIG. 1 is a block diagram depicting one embodiment of a system using a pattern of overlapping circles.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual acts may be performed. The following detailed description is, therefore, not to be taken in a limiting sense.

FIG. 1 is a block diagram depicting one embodiment of a system 100 using a pattern of overlapping circles. System 100 includes a rotatable object 102. The rotatable object 102 has an outer surface 101. As used herein, the term 'rotatable object' is defined as an object that is free to rotate about at least one axis. In this embodiment, the rotatable object 102 is a sphere that is rotatable about each of orthogonal coordinate axes 103, 105, and 107. The object 102 is suspended by bearings 108 which enable the object 102 to rotate. For example, bearings 108 can be implemented as ball bearings, in some embodiments. In other embodiments, the bearings 108 are implemented as gas bearings, such as the gas bearings described in U.S. Patent Application Publication No. 2006/0054660, which is hereby incorporated herein by reference.

On the surface 101 of object 102 is a pseudo-random pattern 104 of overlapping rounded shapes. As used herein, a rounded shape is a shape defined by a rounded closed-ended line. For example, in this embodiment, the rounded shapes are implemented as circles. As shown in FIG. 1, the overlapping circles are located in a pseudo-random pattern on the surface 101. In some embodiments, the location of overlapping circles in pattern 104 on the surface 101 is determined using techniques such as those described in U.S. Pat. No. 7,593,829, which is hereby incorporated herein by reference. For example, the techniques described in U.S. Pat. No. 7,593,829 can be used to determine pseudo-random location for intersection points between two or more circles. The circles are then etched, machined, painted on, adhered to or otherwise placed on the surface 101 based on a predetermined radius extending from the intersection point to a center point of the respective circles. Alternatively, the techniques described in U.S. Pat. No. 7,593,829 can be used to determine a pseudo-random pattern for center points of the plurality of circles. The circles are then placed in the surface based on the predetermined radius extending from the center point. In some embodiments, each circle has the same radius.

The system 100 also includes an image sensor 106 configured to capture images of the surface 101. The image sensor is secured in a static position to take images of the same portion of the surface 101. The image sensor can be implemented using any appropriate imaging technology such as, but not limited to, charge-coupled device (CCD) technology, complimentary metal-oxide semiconductor (CMOS) technology, a monocular camera system, stereo vision system, etc. The images collected by the image sensor are provided to a processing unit 108.

Figure 2:
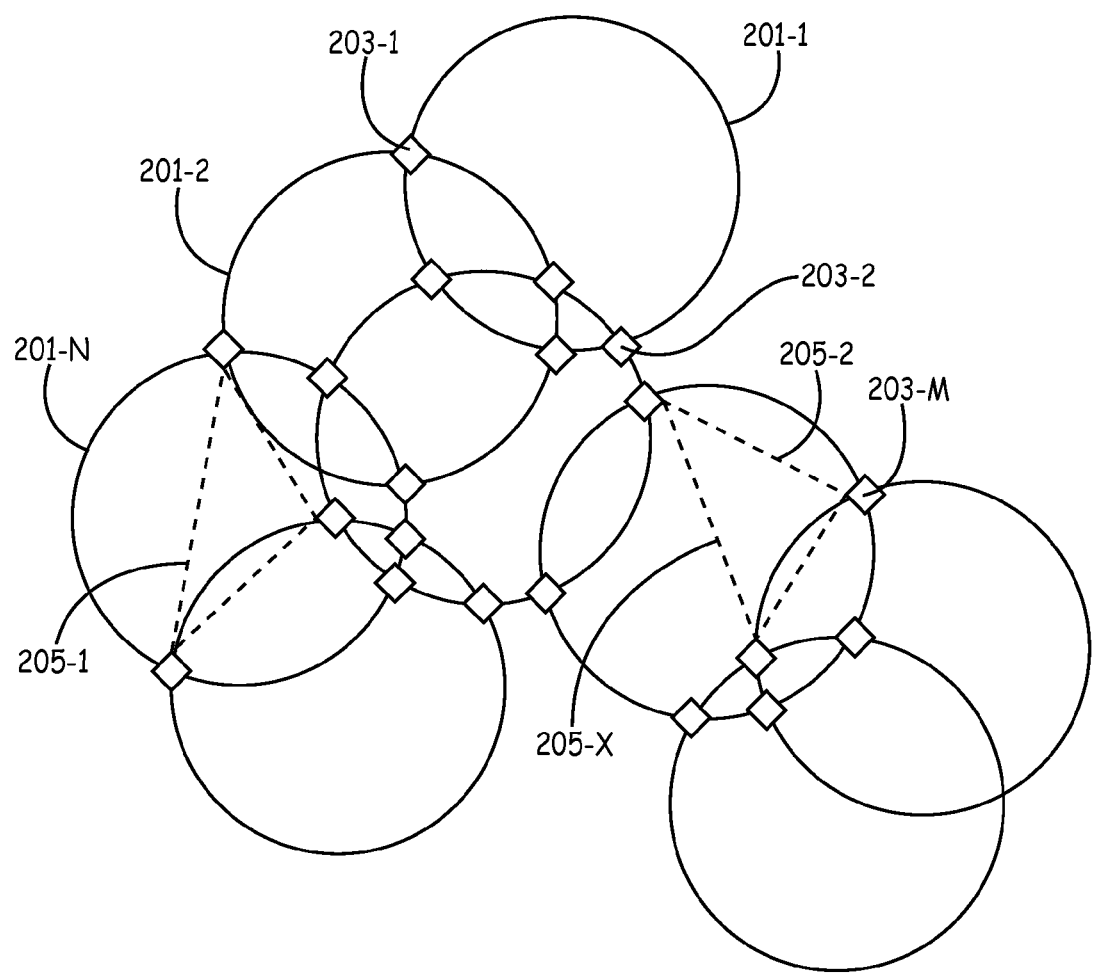
FIG. 2 is a diagram of an exemplary pattern of overlapping circles.

The processing unit 108 is configured to correlate the pattern 104 of overlapping circles in the received image with a pseudo-random pattern map 112 stored on a memory 110. The map 112 is a two-dimensional map that corresponds to the pattern 104 on the surface 101. An exemplary two-dimensional map is shown in FIG. 2. As shown in FIG. 2, a plurality of circles 201-1 . . . 201-N overlap at a plurality of intersection points 203-1 . . . 203-M. The processing unit 108 correlates the two dimensional map with the image of a portion of the surface 101 by comparing the intersection points 203-1 . . . 203-M in the two dimensional map with intersection points identified in the received image. Alternatively, the two dimensional map 112 is implemented in other embodiments as a point map. That is, in a point map, the intersection points 203-1 . . . 203-M are depicted as points in the map and the circles 201-1 . . . 201-N are omitted. In such embodiments, the points of the point map are correlated with the intersection points of the received image.

The processing unit correlates the received image with the map 112, in this embodiment, by comparing relative distances 205-1 . . . 205-X between intersection points 203-1 . . . 203-M with the relative distances between intersection points in the received image. Additional details regarding exemplary techniques for correlating the map 112 and the received image of surface 101 are described in U.S. Pat. No. 7,295,947 which is hereby incorporated herein by reference.

The processing unit 108 identifies the intersecting points in the image by tracing the paths of the rounded shapes until finding paths that overlap. Hence, if a point in the received image does not lie on an arc of one of the circles in the received image, the processing unit 108 does not consider that point for the correlation with the map 112. In this way, the effect of noise in the image is limited since points not lying on an arc are not included in the correlation calculation. Hence, the rounded shapes can be implemented as circles, ovals, ellipses, etc. Exemplary sources of noise can be, but are not limited to, error in the image sensor 106, inconsistencies in the surface 101, inconsistencies in the image sensor lens, light noise/glare caused by ambient light to view the surface 101, contaminants on the surface 101, and/or contaminants on the lens of image sensor 106.

After correlating the portion of the surface 101 in the received image with the corresponding segment of the map 112, the processing unit 108 calculates movement of the object 102 by comparing the scene of the correlated image to the scene of previous correlated images, in some embodiments. In particular, the processing unit 108 determines how the object 102 has rotated about the axes 103, 105, and 107 by comparing how the identified intersection points have changed position from one image to another. In addition, in some embodiments, the processing unit 108 is configured to determine an absolute position of the rotatable object by comparing the portion of the surface 101 in the received image to the portion of the surface that is captured in an image when the rotatable object 102 is at a home or starting position. That is, the processing unit 108 determines the rotation needed along each of axes 103, 105, 107 to cause the portion of the surface 101 to be in the field-of-view of the image sensor 106.

Furthermore, in some embodiments that implement the rounded shapes as circles, the processing unit 108 is configured to calibrate the image sensor 106 and field-of-view environment. In other words, the processing unit 108 calibrates for the relationship between the curvature of the surface 101 and curvature of a lens in the image sensor 106. For example, when the radius of each circle in the pattern 104 has the same predetermined radius, the processing unit 108 is configured to compare the shape of identified circles to a model circle having the predetermined radius. For example, the circles are identified, in some embodiments, by matching the observed pattern received from the image sensor 106 with a similar pattern in the pre-determined map 112. In another embodiment, the arc or portion of the circle that is located nearest the center of the received image is used to calculate the characteristics of the model circle Based on differences in the shape of the identified circle from the received image as compared to the model circle, the processing unit 108 is able to calculate the effects of the curvature of the surface 101 and diffraction due to the curvature of the lens in the image sensor 106. The processing unit 108 is configured to account for the curvature effects when calculating changes in position of the circles to determine movement of the rotatable object 102. For example, the processing unit 108 can calculate a set of calibration factors that are applied to adjust pixel locations and/or pixel intensities.

The processing unit 108 includes or functions with software programs, firmware or other computer readable instructions for carrying out various methods, process tasks, calculations, and control functions, used in performing the operations described above, such as correlating the circles in the images captured by the image sensor 106 with a map 112 of the overlapping pattern stored on the memory 110.

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk—Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

Figure 3:
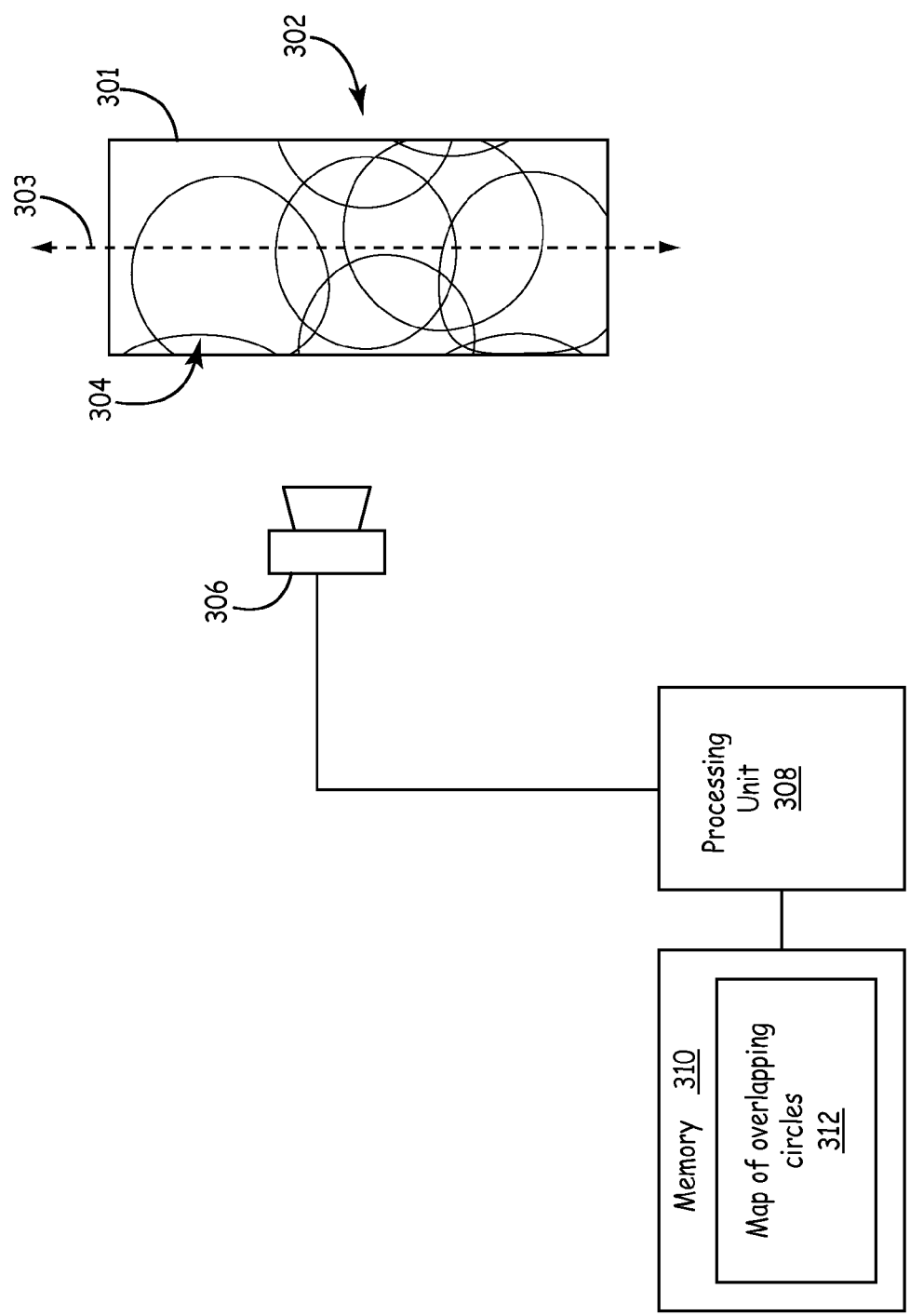
FIG. 3 is a block diagram of another embodiment of a system using a pattern of overlapping circles.

Although only one image sensor 106 is shown in FIG. 1, it is to be understood that, in other embodiments, more than one image sensor 106 are used. Furthermore, although the example system of FIG. 1 implements the rotatable object as a sphere, it is to be understood that other shapes can be used in other embodiments. For example, in the embodiment shown in FIG. 3, the rotatable object 302 is implemented as a cylinder that rotates about a single axis 303. The other elements shown in FIG. 3 operate similarly to those described above with respect to FIG. 1.

Figure 4:
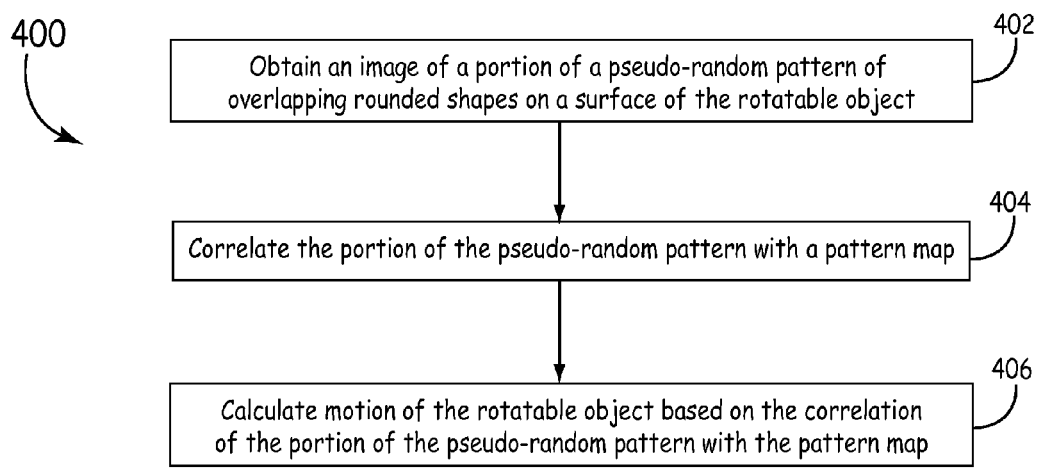
FIG. 4 is a flow chart depicting one embodiment of a method of determining motion of a rotatable object.

FIG. 4 is a flow chart depicting one embodiment of a method 400 of determining motion of a rotatable object such as rotatable object 102. At block 402, an image is obtained of a portion of a pseudo-random pattern of overlapping rounded shapes on a surface of the rotatable object. For example, one or more image sensors can be placed to capture images of a portion of the surface of the rotatable object. In some embodiments, the rotatable object is a sphere. In other embodiments, the rotatable object is a cylinder, plane, or other figure that is rotatable about at least one axis, as described above. Similarly, in some embodiments, the rounded shapes are circles, whereas, in other embodiments, the rounded shapes are ellipses or ovals.

At block 404, the portion of the pseudo-random pattern in the obtained image is correlated with a pattern map that corresponds to the pseudo-random patter on the surface of the rotatable object. As described above, in some embodiments, the pattern map is a two dimensional point map, each point corresponding to an intersection point in the pseudo-random pattern. The intersection points are points where two or more rounded shapes overlap. In other embodiments, the pattern map is a two dimensional pattern including the overlapping shapes and intersection points. Correlating the portion of the pseudo-random pattern with the pattern map includes, in some embodiments, comparing the relative distances between intersection points with the relative distances between points in the pattern map to identify the portion of the pseudo-random pattern in the image, as described above.

At block 406, the motion of the rotatable object is calculated based on the correlation of the portion of the pseudo-random pattern with the pattern map. For example, in some embodiments, the correlated image is compared with other correlated images obtained at other moments in time to determine how the pattern has changed from one moment in time to another. By determining the rotation necessary to effect the change in location of the pseudo-random pattern on the surface of the rotatable object, the rotation of the rotatable object about the at least one axis is also determined. Similarly, in other embodiments, one or more correlated images are each compared to an initial correlated image that corresponds to initial or rest position of the rotatable object. In such embodiments, the absolute position of the rotatable object can be determined through the comparison to the initial position.

Figure 5:
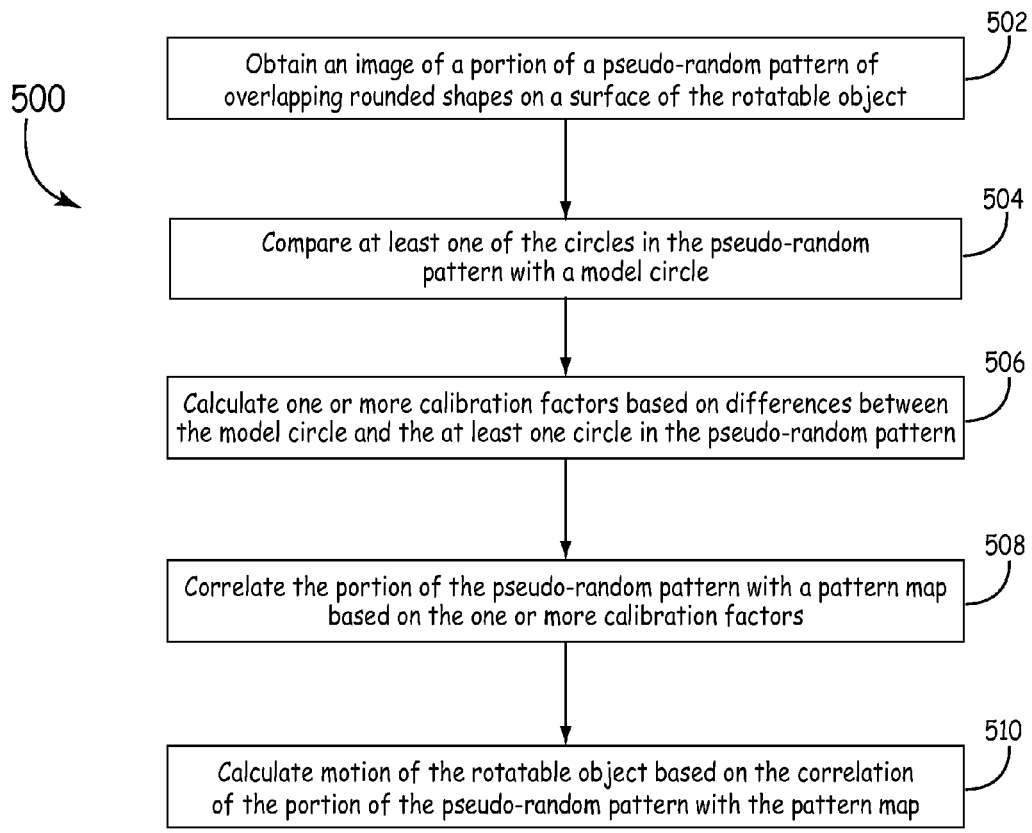
FIG. 5 is a flow chart depicting another embodiment of a method of determining motion of a rotatable object.

FIG. 5 is a flow chart of another embodiment of a method 500 of determining motion of a rotatable object such as rotatable object 102. In the example described in FIG. 5, the rounded shapes on the surface of the rotatable object are circles. At block 502, an image is obtained of a portion of a pseudo-random pattern of overlapping circles on a surface of the rotatable object, as described above with respect to block 402. At block 504, at least one of the circles in the image is compared to a model circle. In particular, each circle in the pseudo-random pattern has the same radius within a predetermined degree of tolerance. For example, in etching the circles on the surface of the rotatable object, slight variations in the actual shape/radius of the circles may occur. The model circle is a circle having the same radius as the circles in the pseudo-random pattern. Differences in the shape of the at least one circle in the pseudo-random pattern as compared to the model circle are attributed to the effects of the environment. For example, the curvature of the rotatable object and curvature of the lens in the image sensor can cause distortions in the shape of the circles in the image of the pseudo-random pattern.

At block 506, one or more calibration factors are calculated based on the differences determined at block 504. In particular, the one or more calibration factors compensate for the effects of curvature and other sources of distortion in the shape of the circles. At block 508, the portion of the pseudo-random pattern in the obtained image is correlated with a pattern map, as described above with respect to block 404. However, at block 508, the one or more calibration factors are used for correlation with the pattern map to obtain a more accurate correlation by compensating for distortion of the circles in the image. At block 510, the motion of the rotatable object based on the correlation of the portion of the pseudo-random pattern with the pattern map is calculated, as described above with respect to block 406.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A system comprising:
    a rotatable object having a pseudo-random pattern of intersection points of overlapping rounded shapes on an outer surface of the rotatable object;
    an image sensor configured to capture an image of a portion of the pseudo-random pattern on the outer surface;
    a memory configured to store a pattern map corresponding to the pseudo-random pattern on the outer surface of the rotatable object; and
    a processing unit configured to correlate the portion of the pseudo-random pattern of intersection points in the captured image with a corresponding portion of the pattern map stored on the memory.

2. The system of claim 1, wherein the processing unit is further configured to compare the correlated image with one or more previously correlated images to calculate motion of the rotatable object.

3. The system of claim 2, wherein the processing unit is configured to compare the correlated image with an image correlated with an initial position of the rotatable object.

4. The system of claim 1, wherein the processing unit is configured to correlate the portion of the pseudo-random pattern with the corresponding portion of the pattern map by comparing relative distances between intersection points in the portion of the pseudo-random pattern with relative distances between points in the pattern map.

5. The system of claim 1, wherein the rotatable object is a sphere.

6. The system of claim 5, wherein the sphere is suspended by a plurality of bearings such that the sphere is rotatable along three orthogonal axes.

7. The system of claim 1, wherein the rotatable object is implemented as one of a cylinder and a planar surface.

8. The system of claim 1, wherein the pseudo-random pattern of intersection points of overlapping rounded shapes is implemented as a pseudo-random pattern of intersection points of overlapping circles.

9. The system of claim 8, wherein each of the circles in the pseudo-random pattern has the same radius.

10. The system of claim 9, wherein the processing unit is configured to compare at least one of the circles in the portion of the pseudo-random pattern with a model circle having the same radius; the processing unit further configured to calculate one or more calibration factors based on differences between the model circle and the at least one circle in the portion of the pseudo-random pattern.

11. A program product comprising a non-transitory processor-readable medium on which program instructions are embodied, wherein the program instructions are configured, when executed by at least one programmable processor, to cause the at least one programmable processor to:
    compare at least one of a plurality of circles in a received image with a model circle, the received image comprising a scene of a portion of a pseudo-random pattern of intersection points of overlapping circles on a surface of a rotatable object;
    calculate one or more calibration factors based on differences between the model circle and the at least one circle in the received image; and
    correlate the received image with a corresponding pattern map stored on a memory device based in part on the one or more calibration factors.

12. The program product of claim 11, wherein the program instructions are configured to cause the at least one programmable processor to:
    correlate subsequently received images of the pseudo-random pattern with the pattern map based in part on the one or more calibration factors; and
    compare the subsequently correlated images with one another to calculate motion of the rotatable object.

13. The program product of claim 11, wherein the received image is a first received image corresponding to an initial position of the rotatable object and the program instructions are configured to cause the at least one programmable processor to:
    correlate subsequently received images of the pseudo-random pattern with the pattern map based in part on the one or more calibration factors; and compare each of the subsequently correlated images with the first received image to calculate a position of the rotatable object relative to the initial position.

14. The program product of claim 11, wherein the program instructions are configured to cause the at least one programmable processor to correlate the portion of the pseudo-random pattern with the corresponding pattern map by comparing relative distances between the intersection points created by the overlapping circles in the portion of the pseudo-random pattern with relative distances between points in the pattern map.

15. The program product of claim 14, wherein the program instructions are configured to cause the at least one programmable processor to compare relative distances between the intersection points with relative distances between the points in the pattern map.

16. A method of determining motion of a rotatable object, the method comprising:
   obtaining an image of a portion of a pseudo-random pattern of intersection points created by overlapping rounded shapes on a surface of the rotatable object;
   correlating the portion of the pseudo-random pattern with a pattern map, the pattern map corresponding to the pseudo-random pattern of intersection points created by the overlapping rounded shapes; and
   calculating motion of the rotatable object based on the correlation of the portion of the pseudo-random pattern with the pattern map.

17. The method of claim 16, wherein correlating the portion of the pseudo-random pattern with the pattern map comprises comparing relative distances between intersection points created by the overlapping rounded shapes in the portion of the pseudo-random pattern with relative distances between points in the pattern map.

18. The method of claim 16, wherein the rounded shapes are circles and the method further comprises:
   comparing at least one of the circles in the pseudo-random pattern with a model circle; and
   calculating one or more calibration factors based on differences between the model circle and the at least one circle in the pseudo-random pattern;
   wherein correlating the portion of the pseudo-random pattern with the pattern map further comprises correlating the pseduo-random pattern with the pattern map based in part on the one or more calibration factors.

19. The method of claim 16, wherein calculating motion of the rotatable object comprises:
   correlating subsequently obtained images of the pseudo-random pattern with the pattern map; and
   comparing the subsequently correlated images with one another to calculate motion of the rotatable object based on difference in the subsequently correlated images.

20. The method of claim 16, wherein calculating motion of the rotatable object comprises:
   correlating subsequently obtained images of the pseudo-random pattern with the pattern map; and
   comparing each of the subsequently correlated images with an initial correlated image of the pseudo-random pattern to calculate a position of the rotatable object relative to an initial position corresponding to the initial correlated image.

* * * * *